Patented Dec. 5, 1939

2,182,309

UNITED STATES PATENT OFFICE 2,182,309

ORGANIC PHOSPHATES

Edgar C. Britton and Clarence L. Moyle, Midland, Mich., assignors to The Dow Chemical Company, Midland, Mich., a corporation of Michigan No Drawing. Application August 20, 1938,
Serial No. 225,940

7 Claims. (Cl. 260—461)

This invention concerns certain new chemical compounds, viz., mixed triaryl phosphates containing a single 2,4-dibromphenyl group and having the general formula,

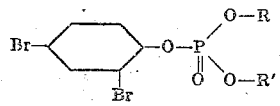

wherein R and R' each represents an aromatic radical other than the 2,4-dibromphenyl radical.

The new triaryl phosphates are useful as plasticizing agents for cellulose derivative, e. g. cellulose acetate, nitrocellulose, ethyl cellulose, etc., compositions. Many of the new compounds are high-boiling, viscous liquids of high specific gravity. They do not corrode or attack rubber or steel and, accordingly, are particularly valuable as core fluids for golf balls, wherein it is desirable to employ a high-boiling, low-freezing liquid which has a density of 1.40 to 1.65 and which does not attack the rubber windings of the ball or corrode the steel needle used to inject the fluid into the ball.

The new mixed phosphates having the above general formula may be prepared by reacting a phosphorus oxyhalide, e. g. phosphorus oxychloride or phosphorus oxybromide with 2,4-dibromphenol to form a 2,4-dibromphenyl phosphoric acid dihalide and thereafter reacting such intermediate product with other phenols, e. g. phenol, cresol, naphthol, p-phenyl-phenol, etc. to form the mixed triaryl phosphate product. If desired, the order in which the different phenols are reacted may be changed. For example, a phosphorus oxyhalide may first be reacted with phenols other than 2,4-dibromphenol to form an aryl phosphoric acid mono-halide and the latter may then be reacted with 2,4-dibromphenol to form the desired mixed triaryl phosphate product. Also, the triaryl phosphate may be prepared by reacting 2,4-dibromphenol with any diaryl phosphoric acid mono-halide which does not contain the 2,4-dibromphenyl radical, e. g. phenyl naphthyl phosphoric acid chloride, dixenyl phosphoric acid bromide, tertiarybutylphenyl cyclohexylphenyl phosphoric acid bromide, di-tertiaryoctylphenyl phosphoric acid chloride, etc.

Each of the above reactions is carried out by heating a mixture of the necessary reactants to a temperature at which hydrogen halide is readily evolved from the reaction mixture, preferably in the presence of a catalyst such as metallic calcium, magnesium or aluminum, or a chloride of magnesium, aluminum or iron. The reactions are preferably carried out at the lowest convenient temperature, e. g. below about 200° C., since at higher temperatures by-product formation may occur to an objectionable extent.

In preparing a mixed organic phosphate of the present class from a phosphorus oxyhalide and the necessary phenolic compounds, the intermediate phosphoric acid halide product may be separated and purified, e. g. by fractional distillation, before carrying out the successive reactions to form the mixed triaryl phosphate product. In practice, however, it is more convenient merely to distill unreacted phosphorus oxyhalide from the impure intermediate aryl phosphoric acid halide, add the necessary proportion of the second phenol and continue the reaction as hereinbefore described to obtain the final product. The latter consists largely of a single mixed triaryl phosphate having the general formula hereinbefore presented, but may contain a minor proportion of a second mixed triaryl phosphate as well as some symmetrical triaryl phosphate formed by over-reaction of one of the phenol reactants with the phosphorus oxyhalide in the initial stage of the process. Such impure mixed phosphate product is adapted to most uses to which the pure compound is suitable and, accordingly, is a valuable product. When desired, the individual phosphates contained in such product can usually be separated by fractional distillation.

The following examples will illustrate several ways in which the principle of the invention has been applied but should not be construed as limiting the same:

Example 1

A mixture of 504 grams (2.0 mols) of 2,4-dibromphenol, 924 grams (6.0 mols) of phosphorus oxychloride, and 2 grams of magnesium chloride was heated at a temperature of 90° to 95° C. for 2 hours, during which time hydrogen chloride was evolved from the mixture. When the reaction was complete, excess phosphorus oxychloride was distilled off under vacuum, 602 grams being recovered. The crude 2,4-dibromphenyl phosphoric acid dichloride was cooled to a temperature of approximately 70° C. and 376 grams (4.0 mols) of phenol were added. The temperature was gradually raised to 156° C. over a period of 4 hours, at the end of which time the evolution of hydrogen chloride gas had ceased. The mixture was then cooled, washed with water to remove dissolved hydrogen chloride and fractionally distilled under vacuum. There was obtained 779 grams of 2,4-dibromphenyl diphenyl phosphate, a slightly viscous liquid distilling at 273° to 283° C. under 8 millimeters pressure and having a specific gravity of 1.627 at 25/25° C. and an index of refraction, $$n_D^{25} = 1.5992$$

2,4-dibromphenyl diphenyl phosphate has the formula

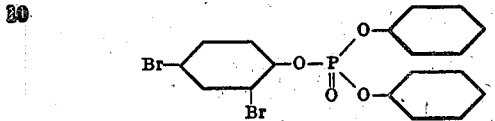

Example 2

369 grams (1 mol) of 2,4-dibromphenyl phosphoric acid dichloride, prepared by reacting 2,4-dibromphenol with phosphorus oxychloride as in Example 1, was heated with 300 grams of carvacrol in the presence of 2 grams of magnesium chloride at a temperature of 95° to 165° C. for 4 hours. The reaction product was washed with water and fractionally distilled under vacuum. There was obtained 477 grams of 2,4-dibromphenyl di-carvacryl phosphate, a pale yellow, viscous liquid distilling at 295° to 305° C. under 8 millimeters pressure and having a specific gravity of 1.400 at 25/25° C. and an index of refraction, $$n_D^{25} = 1.5673$$

2,4-dibromphenyl dicarvacryl phosphate has the formula

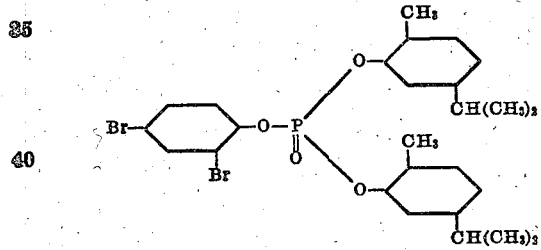

Example 3

A mixture of 332 grams (0.9 mol) of 2,4-dibrom-phenyl phosphoric acid dichloride, prepared as in Example 1, 85 grams (0.9 mol) of phenol, 93 grams (0.9 mol) of o-cresol, and 2 grams of magnesium chloride was heated for 6 hours at a temperature of 90° to 160° C. The reaction product was washed and fractionally distilled under vacuum. 2,4-dibromphenyl phenyl o-cresyl phosphate was obtained as a pale yellow liquid distilling at 270° to 285° C. under 8 millimeters pressure. It has a specific gravity of 1.564 at 25/25° C., an index of refraction, $$n_D^{25} = 1.5934$$

and the formula

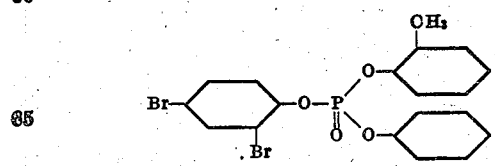

Example 4

2,4-dibromphenyl di-(o-cresyl) phosphate was prepared by reacting 2 mols of o-cresyl with 1 mol of crude 2,4-dibromphenyl phosphoric acid chloride at 85° to 165° C. for 4½ hours as in Example 2. The reaction product was washed and fractionally distilled whereby 2,4-dibromphenyl di-(o-cresyl) phosphate was obtained as a pale yellow, viscous liquid distilling at 290° to 300° C. under 6 millimeters pressure and having a specific gravity of 1.576 at 25/25° C., and an index of refraction, $$n_D^{25} = 1.5939$$

and the formula

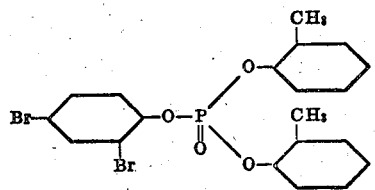

Other mixed triaryl phosphates of the present class may be prepared by reacting a phosphorus oxyhalide with 2,4-dibromphenol to form a 2,4-dibromphenyl phosphoric acid dihalide and thereafter reacting this latter compound with other phenols, preferably hydrocarbon substituted phenols such as the alkyl, aryl, and cycloalkyl phenols, etc. For example, the 2,4-dibromophenyl phosphoric acid dihalide may be reacted with p-ethylphenol to form 2,4-dibromphenyl di-(p-ethylphenyl) phosphate; with o-chlorphenol to form 2,4-dibromphenyl di-(o-chlorphenyl) phosphate; with p-tertiarybutylphenol and p-phenylphenol to form 2,4-dibromphenyl p-tertiarybutylphenyl p-xenyl phosphate; with 2,4-dimethylphenol to form 2,4-dibromphenyl di-(2,4-dimethylphenyl) phosphate; with alpha naphthol to form 2,4-dibromphenyl di-(alpha-naphthyl) phosphate; with isopropyl phenol and m-cresol to form 2,4-dibromphenyl isopropylphenyl m-cresyl phosphate; with 2,4,6,-triethyl phenol to form 2,4-dibromphenyl di-(2,4,6-triethylphenyl) phosphate; with thymol and phenol to form 2,4-dibromphenyl thymyl phenyl phosphate; with o-cyclohexylphenol to form 2,4-dibromphenyl di-(o-cyclohexylphenyl) phosphate; etc.

Other modes of applying the principle of our invention may be employed instead of those explained, change being made as regards the materials employed, provided the products stated by any of the following claims or the equivalent of such stated products be obtained.

We therefore particularly point out and distinctly claim as our invention:

1. A mixed triaryl phosphate having the general formula

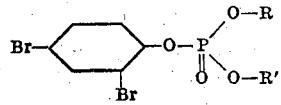

wherein R and R' each represents an aromatic hydrocarbon radical.

2. A mixed triaryl phosphate having the general formula

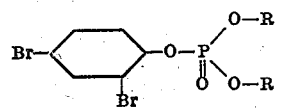

wherein each R represents the same aromatic hydrocarbon radical.

3. A mixed triaryl phosphate having the general formula

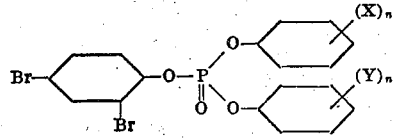

wherein X and Y each represents a substituent selected from the class consisting of alkyl, aryl, and cycloalkyl radicals and hydrogen, and $n$ represents an integer not greater than 3.

4. A mixed triaryl phosphate having the general formula

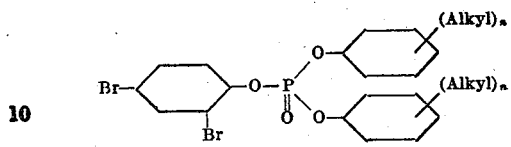

wherein $n$ represents an integer not greater than 3.

5. 2,4-dibromphenyl di-phenyl phosphate, a slightly viscous liquid distilling at approximately 273° to 283° C. under 8 millimeters pressure and having a specific gravity of about 1.627 at 25/25° C. and the formula

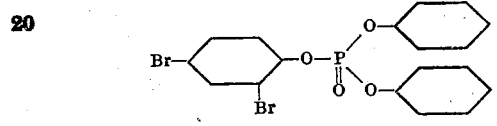

6. 2,4-dibromphenyl di-carvacryl phosphate, a viscous liquid distilling at approximately 295° to 305° C. under 8 millimeters pressure and having a specific gravity of about 1.400 at 25/25° C. and the formula

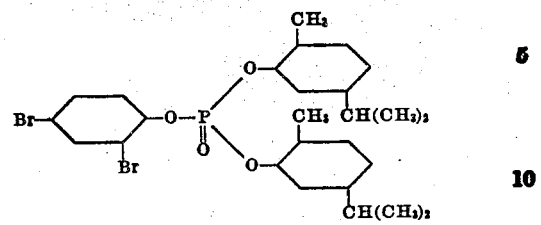

7. 2,4-dibromphenyl phenyl o-cresyl phosphate, a pale yellow liquid distilling at approximately 270° to 285° C. under 8 millimeters pressure and having a specific gravity of about 1.564 at 25/25° C. and the formula

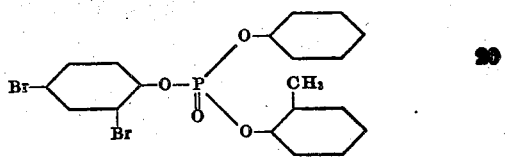

EDGAR C. BRITTON.
CLARENCE L. MOYLE.